3,002,981
ANDROSTENE-16-ONES

Leon Velluz, Paris, and Georges Muller, Nogent-sur-Marne, France, assignors to Les Laboratoires Francais de Chimiotherapie, Paris, France, a corporation of France
No Drawing. Filed May 11, 1960, Ser. No. 28,251
Claims priority, application France June 12, 1959
3 Claims. (Cl. 260—397.3)

The invention relates to novel androstene-16-ones as well as to their production. It relates especially to the androstene-16-ones of the formula:

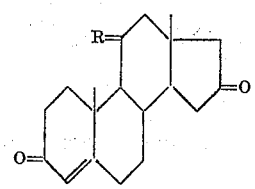

wherein

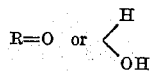

and more particularly, to $\Delta^4$-androstene-11$\beta$-ol-3,16-dione and $\Delta^4$-androstene-3,11,16-trione.

The products of the invention are distinguished by a good antilipemic activity and are used principally as antagonists to prevent $\beta$-lipoproteins from increasing in the bloodstream. It is also possible to use them as starting materials for the production of other physiologically active steroid derivatives such as the 16-hydroxylated compounds. It is possible, for example, to prepare, starting from the $\Delta^4$-androstene-11$\beta$-ol-3,16-dione, the $\Delta^5$-androstene-3,16-diol, the hypotensive described in U.S. Patent No. 2,759,952. This reaction can be written as shown in Table I.

TABLE I

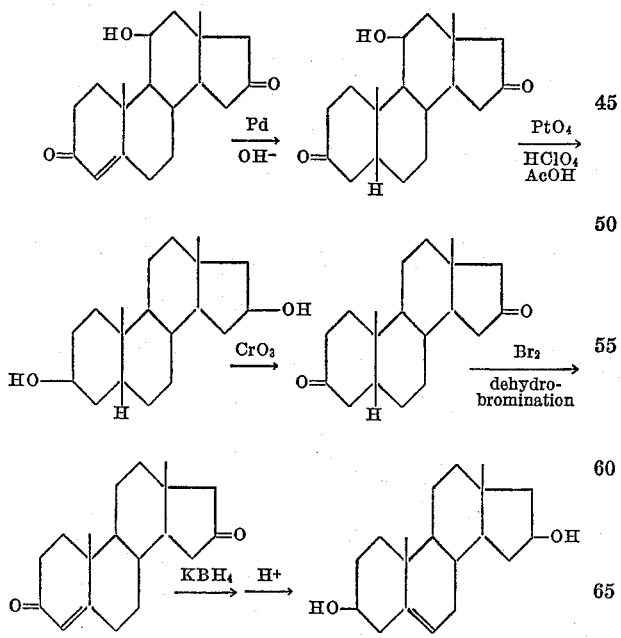

It is an object of the invention to produce novel steroid compounds which are useful pharmaceutical agents, exerting an antagonistic effect against $\beta$-lipoproteins.

A further object of the invention is the obtention of novel androstene-16-ones which are useful intermediates in the preparation of hypotensive agents.

Another object of the invention is to produce $\Delta^4$-androstene-11$\beta$-ol-3,16-dione and $\Delta^4$-androstene-3,11,16-trione.

Another object of the invention is to produce androstene-16-ones by a novel process.

These and other objects and advantages of the invention will become more obvious from the following detailed description.

The androstene-16-ones of the invention are prepared starting with the enolic-3-ethyl ether of $\Delta^4$-androstene-11$\beta$-ol-3,16-dione described in the copending, commonly-assigned U.S. patent application No. 28,250 filed May 11, 1960, entitled "16—Ethynylated Steroid Compounds and Process for Their Production. The process described in this previously filed application consists essentially of introducing an oximinated function into the 16-position of adrenosterone, transforming this oximinated function into an oxo group and eliminating the hydroxyl group in the 17-position by the intermediate of p-toluene sulfonate, after protecting the 3-oxo group in the form of an enolic ethyl ether.

According to the present invention, the enolic-3-ethyl ether of $\Delta^4$-androstene-11$\beta$-ol-3,16 - dione is hydrolized under acidic conditions and the intermediate $\Delta^4$-androstene-11$\beta$-ol-3,16-dione obtained thereby is oxidized.

According to the preferred mode of operation of the process of the invention the enolic-3-ethyl ether of $\Delta^4$-androstene-11$\beta$-ol-3,16-dione is heated in aqueous acetic acid, the $\Delta^4$-androstene-11$\beta$-ol-3,16-dione formed thereby is isolated and the latter is treated with chromic acid in acetic acid in order to isolate finally the $\Delta^4$-androstene-3,11,16-trione. The steps of the process are shown in Table II.

TABLE II

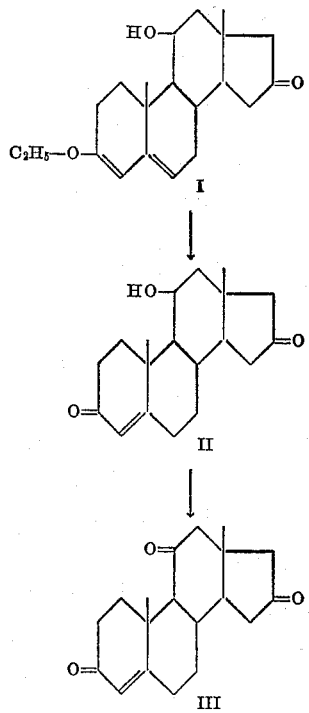

In the following examples there are described several preferred embodiments to illustrate the invention. However, it should be understood that the invention is not intended to be limited to the specific embodiments. The melting points are instantaneous melting points determined on a Kofler block.

Example 1

PRODUCTION OF Δ⁴-ANDROSTENE-11β-OL-3,16-DIONE (II)

0.8 gm. of the enolic 3-ethyl ether of Δ⁴-androstene-11β-ol-3,16-dione (I) is heated for 5 minutes at 100° C. in a mixture of 4 cc. of glacial acetic acid and 0.4 cc. of water. 50 cc. of water are added and the solution is vacuum filtered. The filter cake is washed with water and the product obtained thereby is dissolved in 300 cc. of ether. The solution is dried over magnesium sulfate and concentrated to 20 cc. The concentrate is vacuum filtered, and dried to obtain 0.46 gm. (63% of theory) of Δ⁴-androstene-11β-ol-3,16-dione (II). The product, which is new, is obtained in the form of small colorless crystals, insoluble in water, slightly soluble in ether, soluble in alcohol, acetone and chloroform. Melting point=220° C., specific rotation $[\alpha]_D^{20} = -46°$ ($c=0.5\%$ in chloroform).

*Analysis.*—$C_{19}H_{26}O_3$; molecular weight=302.40. Calculated: C, 75.46%; H, 8.67%. Found: C, 75.3%; H, 8.8%.

Example 2

PREPARATION OF Δ⁴-ANDROSTENE-3,11,16-TRIONE (III)

0.45 gm. of Δ⁴-androstene-11β-ol-3,16-dione (II), obtained according to the preceding example, is dissolved in a mixture of 4.5 cc. of glacial acetic acid and 0.45 cc. of water. While maintaining the temperature at +5° C., 1.1 cc. of a solution of 10% chromic acid in acetic acid is added. The solution is allowed to stand for ten minutes at +5° C. 51 cc. of water are added and the solution is extracted with methylene chloride. The extract is washed with water and with sodium bicarbonate, dried over magnesium sulfate and evaporated to dryness in vacuo. The residue is crystallized from a mixture of ethyl acetate and ether (4:6) and, after vacuum filtering and drying, 0.3 gm. (67% of theory) of Δ⁴-androstene-3,11,16-trione (III) is obtained. This product, which has not yet been described, is obtained in the form of small colorless crystals which are insoluble in water and ether, soluble in acetone, chloroform and methylene chloride. Melting point 130° C., specific rotation $[\alpha]_D^{20} = +26°$ ($c=0.25\%$ in chloroform).

*Analysis.*—$C_{19}H_{24}O_3$; molecular weight=300.38. Calculated: C, 75.97%; H, 8.05%. Found: C, 75.8%; H, 8.2%.

The preceding examples are not limitative of the invention. Such changes and modifications as would occur to one skilled in the art can be made in the invention without departing from the spirit thereof or the scope of the appended claims.

We claim:

1. A compound of the formula

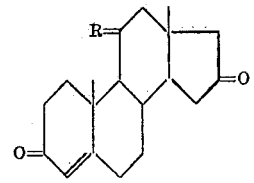

wherein R is selected from the group consisting of =O and

2. Δ⁴-androstene-11β-ol-3,16-dione.
3. Δ⁴-androstene-3,11,16-trione.

References Cited in the file of this patent

UNITED STATES PATENTS 2,855,410    Fried et al. _____ Oct. 7, 1958

OTHER REFERENCES

Oliveto et al.: J.A.C.S. May 5, 1952, pages 2248–50.
Loewenthal: Tetrahedron, vol. 6, June 1959, page 291.